Sept. 3, 1946.   J. A. NEWTON ET AL   2,406,891
SHAFT BEARING ASSEMBLY
Filed July 28, 1944
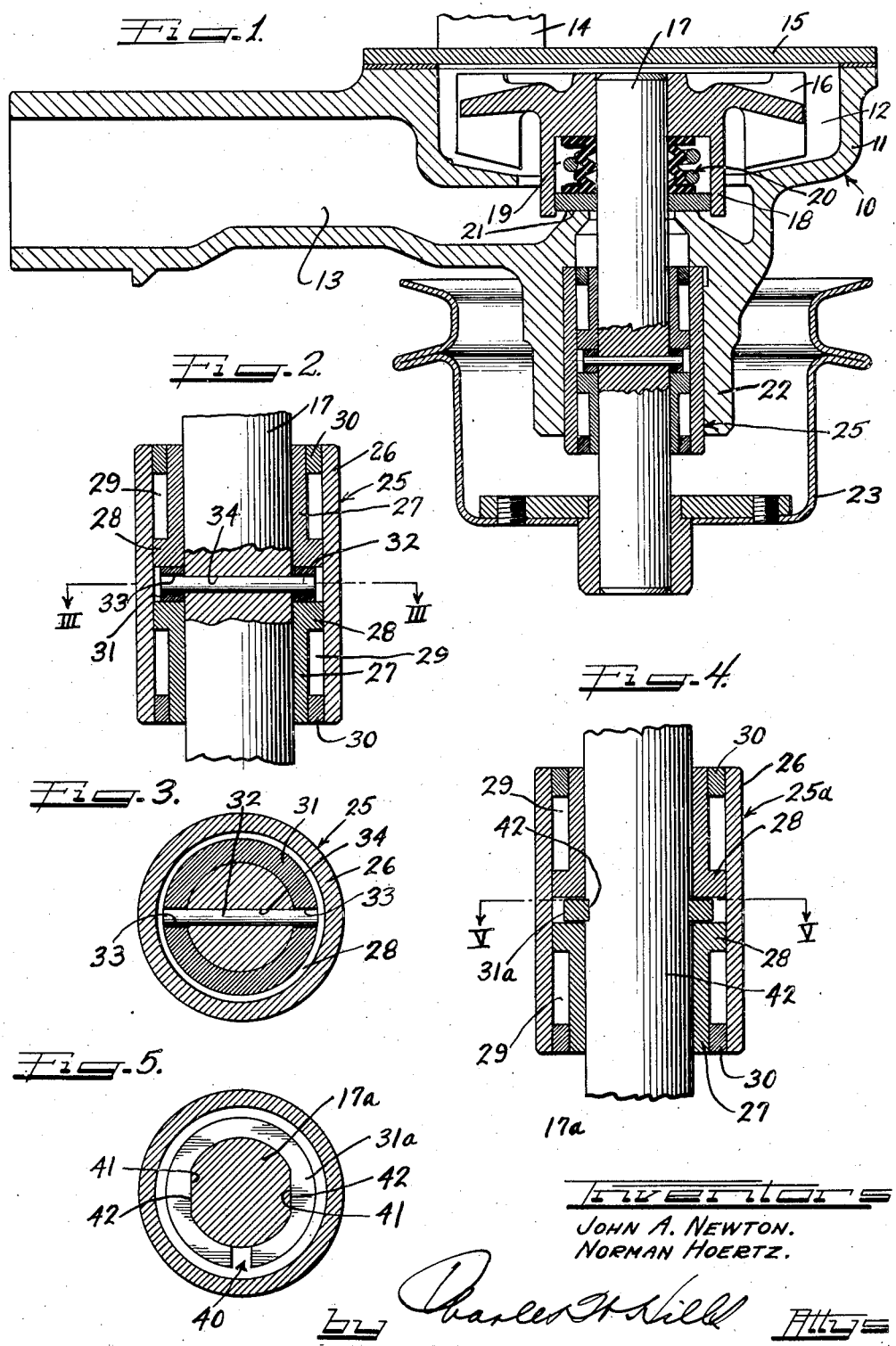
Inventors
JOHN A. NEWTON.
NORMAN HOERTZ.
by Charles H. Hill
Attys Patented Sept. 3, 1946

2,406,891

UNITED STATES PATENT OFFICE 2,406,891

SHAFT BEARING ASSEMBLY

John A. Newton and Norman Hoertz, Cleveland, Ohio, assignors to Thompson Products, Inc., Cleveland, Ohio, a corporation of Ohio Application July 28, 1944, Serial No. 546,983

6 Claims. (Cl. 308—123)

This invention relates to a shaft bearing assembly and more particularly to an inti-frictional bearing for shafts such as a pump shaft.

An object of this invention is to provide a simple form of bearing which can supplant in use a ball bearing and which can accommodate both radial and endwise thrust.

Another object of this invention is to provide a self-lubricating bearing which may be used in lieu of ball bearings.

Still another object of the invention relates to the provision of a simplified and economical form of self-lubricating bearing for shafts such as the shaft of a pump and the like.

Yet another object of the invention relates to the provision of a novel shaft assembly wherein the shaft of a pump or the like may be properly supported without interfering with the other elements associated with the shaft, such, for example, as a seal and an impeller.

In accordance with the general features of this invention, there is provided in a bearing for a shaft and the like, a single unit comprising tightly nested sleeves, the inner of which has self-lubricating and anti-frictional characteristics and an internal end thrust washer positioned wholly within the confines of the unit and rotatable relative to the sleeves and with the shaft on which the bearing unit is mounted whereby the assembly may accommodate both radial and endwise thrust.

A still further feature of the invention as embodied in one form of the invention, relates in the foregoing structure to the securing of the end thrust washer to the shaft in such a manner as by way of a pin whereby the pin has a drive fit with the shaft but is free within openings in the washer to allow for slight misalignment of the parts by reason of movement of the washer.

In another form of the invention the end thrust washer comprises a split ring interlocked with the shaft in groove portions formed in an intermediate portion of the shaft.

Other objects and features of this invention will more fully appear from the following detail description taken in connection with the accompanying drawings which illustrate several embodiments thereof, and in which Figure 1 is a vertical cross-sectional view through a pump having a shaft bearing assembly involving the features of this invention;

Figure 2 is an enlarged fragmentary cross-sectional view corresponding to the bearing part of the shaft illustrated in Figure 1;

Figure 3 is a cross-sectional view taken on the line III—III of Figure 2 looking downwardly and showing the manner in which the end thrust washer is secured to the shaft by a pin;

Figure 4 is a fragmentary sectional view similar to Figure 2 showing a modification of the invention in which the end thrust washer is in the form of a split ring; and Figure 5 is a sectional view similar to Figure 3 but taken on the line V—V of Figure 4 looking downwardly.

As shown on the drawing:

In the accompanying drawing, and more particularly in Figure 1 thereof, we have illustrated our novel shaft bearing assembly as applied to a pump construction wherein the bearing accommodates both radial and endwise thrust incident to the rotation of the impeller in the pump housing. It is, of course, to be understood that the novel bearing of our invention may be used in other applications without departing from the spirit and intent of this invention.

The pump assembly is designated generally by the reference character 10 and includes a hollow housing 11 defining a fluid impelling chamber 12 having an inlet water connection 13 and an outlet 14 formed in a plate 15 suitably attached as by means of cap screws or the like (not shown) to the housing 11. This pump is of the type which is adapted to be secured to the forward end, for example, of an automotive engine for circulating fluid in the cooling system of the engine, as is well known in the art.

Positioned in the pump chamber 12 is an impeller 16 which may be of any suitable construction and which is suitably secured to a central shaft 17 for rotation therewith.

The impeller 16 has a hollow skirt 18 defining a chamber 19 in which is positioned a rubber sealing unit designated generally by the reference character 20. This rubber sealing may be of any suitable construction and does not per se constitute a part of this invention.

The sealing unit 20 is disposed above an annular shouldered surface 21 formed in the pump body or housing 11 in a plane at right angles to the axis of the shaft 17. Also the sealing unit 20, by reason of its inherent resiliency is forced downwardly toward shoulder surface 21 to form a tight engagement with that surface. The unit is thus adapted to serve as a ceiling ring and also as a bearing and end thrust ring.

The housing 11 also includes a boss 22 in which is secured by a drive fit a bearing assembly designated generally by the reference character 25 and which embodies the features of this invention.

Beyond the bearing the shaft has secured to its end a pulley designated generally by the reference character 23 and which may be of any suitable construction. This pulley may be driven by any suitable means on an automotive vehicle, such as by means of a fan belt and is the instrumentality by which the shaft and its integral impeller is rotated.

In Figures 2 and 3 we have illustrated on an enlarged scale one form of bearing designated generally by the reference character 25 which embodies the features of this invention. This bearing assembly includes an outer sleeve 26 which is made of any suitable rigid material, such, for example, as porous bronze and has tightly fitted in it axially aligned porous bronze bushing sections 27—27. These sleeve sections 27—27 define a self-lubricating bearing support for the shaft 17 rotatable in the bearing unit.

It will be perceived that the two bushings 27—27 are identical. Each of them has an annular inner shoulder 28 for bearing against the inner cylindrical surface of the outer sleeve 26, and for spacing the main bushing portion from the sleeve thus defining a grease or lubricant chamber 29. The outer end of each chamber 29 is closed by a porous bronze bearing ring 30 tightly fitted between the bushing 27 and the sleeve 26. This structure provides spaced aligned self-lubricating bearing supports for the shaft 17 and which are adapted to accommodate radial thrust incident to the operation of the shaft.

In accordance with other features of this invention it is desirable to provide in the same bearing unit 25 for the accommodation of end-wise thrust. This is accomplished by the provision at the interior of the bearing unit 25 of a central thrust washer 31 which may be made of any suitable material, such, for example, as metal. As shown in Figures 2 and 3, this washer preferably does not have as large a diameter as the internal diameter of the sleeve 26 and is positioned in an intermediate plane with reference to the opposite ends of the bearing unit 25 and with reference to shoulders or enlargements 28—28.

A pin 32 is inserted in transverse openings 33 in the washer. There are preferably formed in the washer 31 two openings 33—33 which are diametrically opposite so that the washer is pinned at two diametrically opposite points to the shaft 17. The shaft 17 has a transverse opening 34 at right angles to the axis of the shaft which is of a diameter such that the pin 32 can have a drive fit therein. In other words, the pin should be tightly secured to the shaft 17. On the other hand, the extremities of the pin are not tightly fitted in the openings 33—33 of the washer, since, as clearly shown in the drawing, the openings are made slightly larger in diameter than that of the pin. This feature is desirable in that there is permitted a certain amount of freedom of movement of the ends of the pin with reference to the washer, thereby allowing for any misalignment occasioned by movement of the washer.

It will be perceived from Figure 2 that the side faces of the washer 31 are substantially contiguous with the inner shoulders 28—28 of the bushing sections 27—27 and that by reason of the arrangement of this washer the washer is able to take up end thrust in the bearing. Accordingly, we have provided a very simple bearing which is self-lubricating and yet is adapted to accommodate both radial and end-wise thrust without requiring the use of balls or the like as has heretofore been the practice.

In Figures 4 and 5 there is illustrated a modified form of bearing unit designated generally by the reference character 25a, and which is identical to the one shown in Figures 2 and 3, with the exception of the intermediate spaced washer 31a, and its method of attachment to the shaft 17a. The outer sleeve, the aligned bushings and the end bushing rings are identical to those shown in Figs. 2 and 3, and for that reason the same reference numerals are being used on these parts.

In this form of the invention, the end thrust washer is in the form of a split ring 31a having ends spaced at 40, as shown in Fig. 5, and having diametrically opposite inner flat portions 41—41 embracing flats 42—42 formed on opposite sides of the shaft 17a. The flattened portions 42—42 of the shaft are provided by notching out the diametrically opposite sides of the shaft. This arrangement is such that the split washer can swivel on the flats 42—42 of the shaft 17a. Moreover, as shown in Fig. 4, the end faces of the washer 31a may, if it is so desired, be slightly spaced from the spaced shoulders 28 of the two axially aligned bushing sections 27—27. The operation of this form of the invention, however, is substantially the same as that described in connection with the form illustrated in Figures 2 and 3.

We claim as our invention:

1. In a bearing for a shaft and the like, a single unit comprising tightly nested sleeves the inner of which is formed so as to be self-lubricating and have anti-frictional characteristics and an internal end thrust washer positioned wholly within the confines of said unit with a bore aligned axially with that of the inner of said sleeves but rotatable relative to said sleeves and with the shaft on which the bearing unit is to be mounted, said washer being in the form of a split ring.

2. In a bearing for a shaft and the like, a single unit comprising tightly nested sleeves the inner of which is formed so as to be self-lubricating and have anti-frictional characteristics and an internal end thrust washer positioned wholly within the confines of said unit with a bore aligned axially with that of the inner of said sleeves but rotatable relative to said sleeves and with the shaft on which the bearing unit is to be mounted, said washer being in the form of a split ring having opposite flat surface formed to swivel on opposite flats of the shaft.

3. In a bearing structure for a shaft and the like, concentric bushings of porous bronze, said bushings being secured together as a unit and being provided with an end thrust washer internally of the outermost bushing between the end extremities of inner bushings in an intermediate plane, said washer being provided with means for securing it to a shaft on which the bearing is mounted whereby said washer is rotatable relative to all of said bushings, said means comprising a pin at right angles to the bores of said bushings and having its ends loosely mounted in the washer but with its portion between its ends formed for fitting in a transverse hole in the shaft.

4. In a bearing structure for a shaft and the like, concentric bushings of porous bronze secured together as a unit and being provided with an end thrust washer internally of the outermost bushing between the end extremities of axially aligned inner bushings, said washer being provided with means for securing it to a shaft on which the bearing is mounted whereby said washer is rotatable relative to said bushings, said innermost bushings having their adjoining innermost ends shouldered and separated apart to provide a space in which said washer is positioned, said shouldered ends being tightly fitted in the bore of said outermost bushing and end closure rings fitted between the innermost and outermost bushings to form with said shouldered ends radially outer lubricant chambers.

5. In a self-lubricating bearing structure for a shaft and the like, concentric bushings tightly telescoped together as a unit and being provided with an end thrust washer internally of the outermost bushing and between end extremities of axially aligned inner bushings in an intermediate plane, said inner bushings being formed of porous lubricant retaining material said washer being provided with means for securing it to a shaft on which the bearing is mounted whereby said washer is rotatable relative to said bushings, said inner bushings each comprising an unbroken annulus and defining together with the outermost bushing a radially outer lubricant chamber and end annular bushings for closing the outer ends of said chambers.

6. In a bearing structure for a shaft and the like, an outer cylindrical one-piece sleeve, with spaced but aligned bushings telescoping opposite ends of said sleeve in tight interfitted engagement therewith and having their innermost ends spaced apart inside said sleeve, said bushings being made of porous lubricant retaining material, an end thrust washer inside said space within said sleeve, said washer being provided with means for securing it to a shaft on which the bearing is mounted so that the washer is rotatable with the shaft and relative to said bushings and sleeve, said bushings having their adjoining innermost ends shouldered adjacent said washer, the remaining outer surface of each of said bushings being spaced from the inner surface of the sleeve to provide longitudinally spaced annular lubricant chambers between the sleeve and the bushings and end closure rings tightly fitted between the sleeve and the ends of the bushings to close and seal off the ends of said chambers at the opposite ends of said sleeve.

JOHN A. NEWTON.
NORMAN HOERTZ.